UNITED STATES PATENT OFFICE.

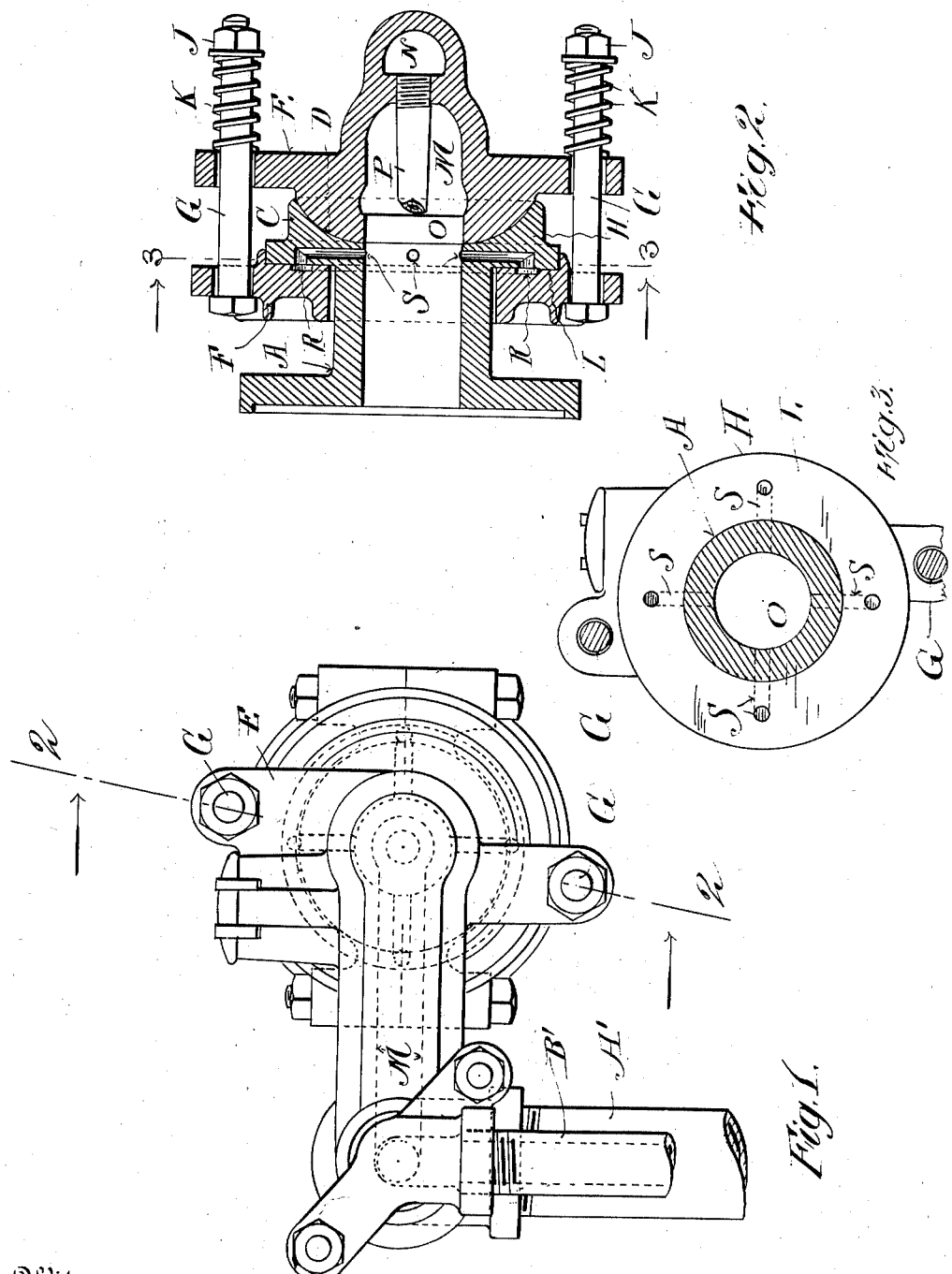

ALONZO ALDRICH, OF BELOIT, WISCONSIN.

BALANCED STEAM FITTING OR JOINT FOR JOURNALS OF ROTARY STEAM-CYLINDERS.

967,294.  Specification of Letters Patent.  Patented Aug. 16, 1910.

Application filed January 18, 1909. Serial No. 472,800.

*To all whom it may concern:*

Be it known that I, ALONZO ALDRICH, a citizen of the United States, residing at Beloit, county of Rock, State of Wisconsin, have made a certain new and useful Invention in Balanced Steam Fittings or Joints for Journals of Rotary Steam-Cylinders, of which the following is a specification.

This invention relates to steam fittings or joints for the journals of rotary steam cylinders or other revolving bodies and embodies improvements over the construction shown, described and claimed in my Patent No. 879,845, granted to me Feb. 25, 1908.

The object of the invention is to provide a balanced steam fitting or joint for the journals of rotary steam cylinders, such, for instance, as are employed for making paper, or for other purposes.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the drawing and to the various views and reference signs appearing thereon,—Figure 1 is a view in end elevation of a fitting or joint for journals embodying the principles of my invention. Fig. 2 is a view in section on the line 2, 2, Fig. 1, looking in the direction of the arrows. Fig. 3 is a view in section on the line 3, 3, Fig. 2, looking in the direction of the arrows.

The same part is designated by the same reference sign wherever it occurs throughout the several views.

In my prior patent, above referred to, I have shown, described and claimed a construction of fitting or joint for journals for revolving steam cylinders wherein provision is made for a relative axial movement of the fitting in its bearing seat in order to compensate for expansion or contraction of the pipes employed to deliver the steam to or from the rotary cylinder. In the construction referred to, the hollow journal A, of the cylinder is formed on its outer end surface with a bearing seat or surface C, to receive a coöperating bearing surface D, of a fitting E, these bearing surfaces being preferably ground to form a steam tight joint, while at the same time permitting slight rotary displacement of the bearing surface of fitting E, in axial relation with respect to the cylinder or journal seat. The fitting E, is held to its seat by means of a collar F, carrying bolts G, which extend through ears formed on the fitting E, and springs or other means K, interposed between nuts J, on the ends of the bolts and the fitting E, serve to efficiently press the fitting seat D, against its coöperating seat C. The collar F, engages against the rear wall of the head of the hollow journal in which the seat C, is formed.

The fitting E, is provided with a portion extending laterally with reference to the bearing seat D, and is provided with a passage M, of large area, delivering through an opening O, formed through the bearing seat D, and into the hollow journal A, and thence into the cylinder. A pipe P, communicating at one end with a smaller passage N, in the fitting E, extends through the opening O, and the hollow journal into the cylinder. Supply and exhaust pipes A′, B′, are suitably connected to the outer end of the fitting and communicate respectively with the passages M, N, in such manner as to provide relative rotative movement of the fitting with relation to said pipes.

From the foregoing description it will be seen that a structure of journal bearing for rotating steam cylinders is provided wherein any expansion or contraction of the supply and exhaust pipes, or any settling or displacement of the mains is accommodated without impairing the efficiency of the joints.

In the practical operation of a joint as above described it will be readily seen that the steam pressure on the fitting E, as defined by the area of the opening O, tends to force the fitting in a direction to cause the collar F, to be drawn tightly against the rear or inner walls L, of the head H, in the outer end surface of which the seat C, is formed. This pressure is transmitted to the collar F, through the yoke bolts G, and as a result objectionable friction is developed tending to impair the efficiency of the apparatus.

It is among the special purposes of the present invention to overcome and avoid this objection, and to provide means whereby the bearing of the collar against the head of the hollow journal is relieved of unnecessary and undue pressure, thereby forming a balanced steam fitting and greatly reducing the friction of operation, and hence securing greater efficiency in operation. In accomplishing these purposes and objects I provide the face of collar F, which bears against the rear wall L, of the head H, with a groove or channel or other form of opening R, preferably equal in area to the area of opening O, and I form ducts or passages S, from the opening O, or passage through which the steam is admitted to the cylinder, said ducts S, being formed through the head H, and delivering to the groove or channel R, thereby permitting steam pressure equal to that imposed on the fitting E, tending to draw the collar against its bearing on the head of the journal, to be exerted upon said collar tending to force it away from said bearing, thereby producing a balanced structure and relieving the journal of undue friction.

Having now set forth the object and nature of my invention and a construction embodying the principles thereof, what I claim as new and useful and of my own invention, and desire to secure by Letters Patent is:—

1. In a steam fitting or joint for journals, the combination with a hollow journal, a relatively movable fitting having a steam joint bearing against said journal a steam pipe connection delivering through the fitting and journal, a collar and connections between the collar and fitting to maintain said joint steam tight, and means for balancing the pressure on said collar.

2. The combination with a journal having a bearing seat in the end thereof, a fitting adapted to said seat said seat and fitting having registering steam passages therethrough, a collar engaging the journal and connected to the fitting to maintain the latter in its seat, and means for balancing the pressure on said collar.

3. The combination with a journal having a head, a rotatively movable steam fitting seated against the front wall of said head said head and fitting having registering steam passages therethrough, a collar bearing against the rear wall of said head and serving to retain the fitting to its seat and means for balancing the pressure on said collar.

4. The combination with a journal having a head, a rotatively movable fitting seated against the front wall of said head said head and fitting having registering steam passages therethrough, a retaining collar therefor seated against the rear wall of said head, and means for admitting steam pressure to the bearing surfaces of said collar and head.

5. The combination with a hollow journal having a head, a fitting seated against said head and having a steam passage registering with the bore of the journal, a collar engaging the rear wall of the head and having connection with the fitting, a steam space between the bearing surfaces of the head and collar, and means for admitting steam from said steam passage to said space.

6. The combination with a journal having a head, a fitting seated against said head and provided with a steam passage delivering through the head, a retaining collar engaging the rear wall of the head and connected to the fitting, a steam space formed in the bearing surfaces of said collar and head and equal in area to the area of said passage and means for delivering steam from said passage to the steam space.

7. The combination with a journal having a head, a fitting seated against said head and mounted for slight axial movement relative thereto said head and fitting having registering steam passages therethrough, a collar engaging the rear wall of said head and connected to said fitting and means for admitting steam to the bearing surfaces of the collar and head.

8. The combination with a hollow journal having a head, a fitting seated against said head said fitting having a steam passage therethrough to register with the bore of said head, a collar having a channel in the face thereof, and bearing against the rear wall of said head, connections between said collar and fitting, and ducts formed in said head and delivering from the bore thereof to said channel.

9. The combination with a hollow journal having a head, a fitting seated against said head and having a steam passage delivering through the bore of said journal, said fitting mounted for slight axial movement with reference to its seat against said head, a retaining collar engaging the rear wall of said head and connected to said fitting, said collar having a channel in the face thereof which bears against the head, said head having ducts delivering from the bore thereof to said channel.

In testimony whereof I have hereunto set my hand in the presence of the subscribing witnesses, on this 12th day of January A. D., 1909.

ALONZO ALDRICH.

Witnesses:
J. A. JANVRIN,
H. C. GOVE.